(12) United States Patent
Ojima

(10) Patent No.: US 6,342,989 B1
(45) Date of Patent: Jan. 29, 2002

(54) MAGNETIC TAPE DRIVE MOUNTING DETECTION APPARATUS

(75) Inventor: Kenichi Ojima, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/517,316

(22) Filed: Mar. 2, 2000

(30) Foreign Application Priority Data

Mar. 5, 1999 (JP) .............................................. 11-059440

(51) Int. Cl.$^7$ .............................................. G11B 33/02
(52) U.S. Cl. ...................................... 360/96.5; 360/92
(58) Field of Search .................................. 360/96.5, 92

(56) References Cited

U.S. PATENT DOCUMENTS 5,741,055 A * 4/1998 Chen ........................... 361/685

* cited by examiner

Primary Examiner—Craig A. Renner
(74) Attorney, Agent, or Firm—Young & Thompson

(57) ABSTRACT

The present invention provides a magnetic tape drive mounting detection apparatus in a composite type magnetic tape apparatus, which detection can surely detecting that a magnetic tape drive is mounted at a predetermined position, while absorbing irregularities between parts. The detection apparatus detects that a magnetic tape drive 1 fixed onto a deck tray 2 sliding in a frame 6 is mounted on a predetermined position of a magnetic tape apparatus. The detection apparatus includes: a fixed plate spring 4 attached to the deck tray 2 for fixing the magnetic tape drive at a predetermined position; and a micro switch attached unitarily with the fixed plate spring 4. The micro switch performs detection operation at a position where the fixed plate spring 4 is firmly fixed to the frame 6.

10 Claims, 6 Drawing Sheets

AFTER MOUNTING MAGNETIC TAPE DRIVE

BEFORE MOUNTING MAGNETIC TAPE DRIVE

AFTER MOUNTING MAGNETIC TAPE DRIVE

FIG.2
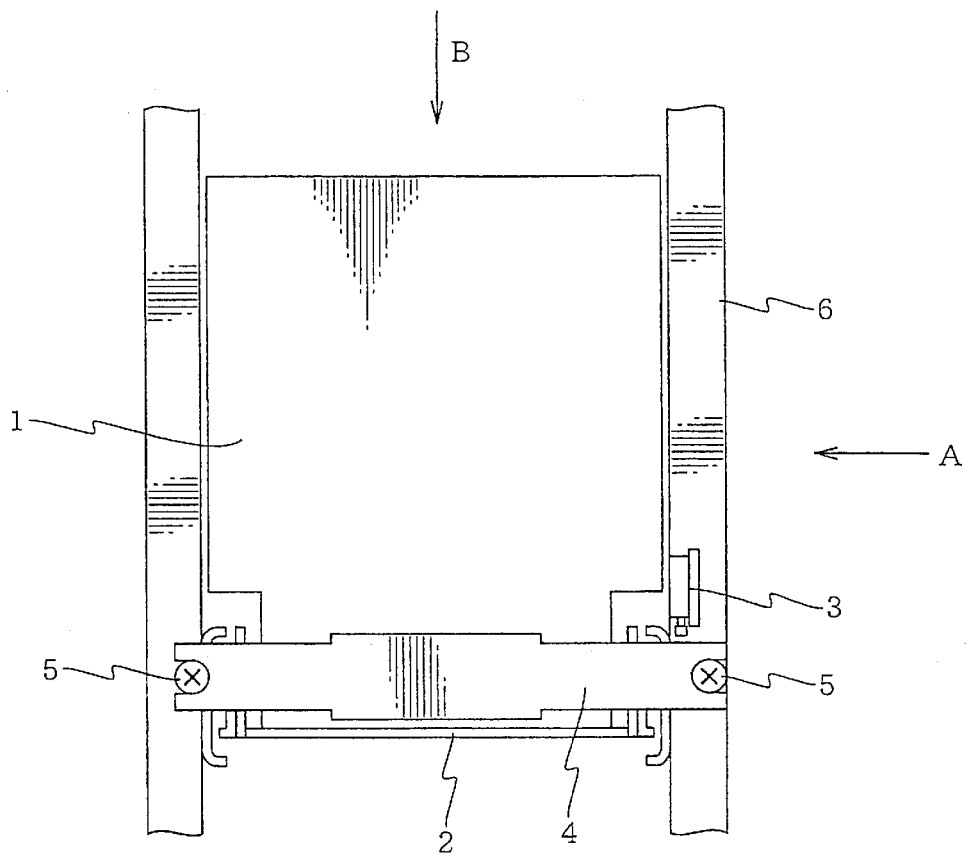
FIG.3(a)            FIG.3(b)
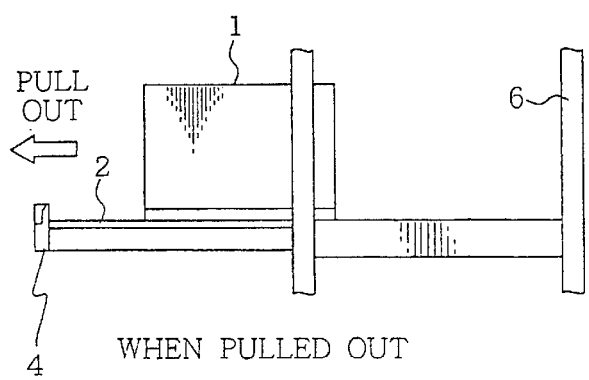 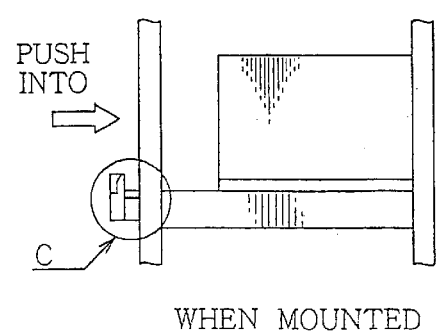
WHEN PULLED OUT       WHEN MOUNTED

PULL OUT

PUSH IN

BEFORE MOUNTING
MAGNETIC TAPE DRIVE

AFTER MOUNTING
MAGNETIC TAPE DRIVE

BEFORE MOUNTING
MAGNETIC TAPE DRIVE

AFTER MOUNTING
MAGNETIC TAPE DRIVE

PRIOR ART

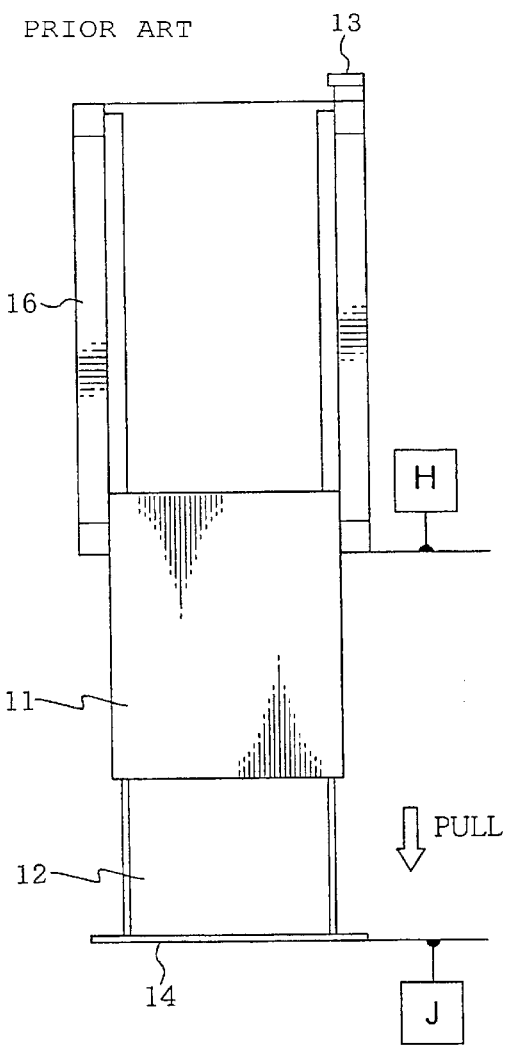
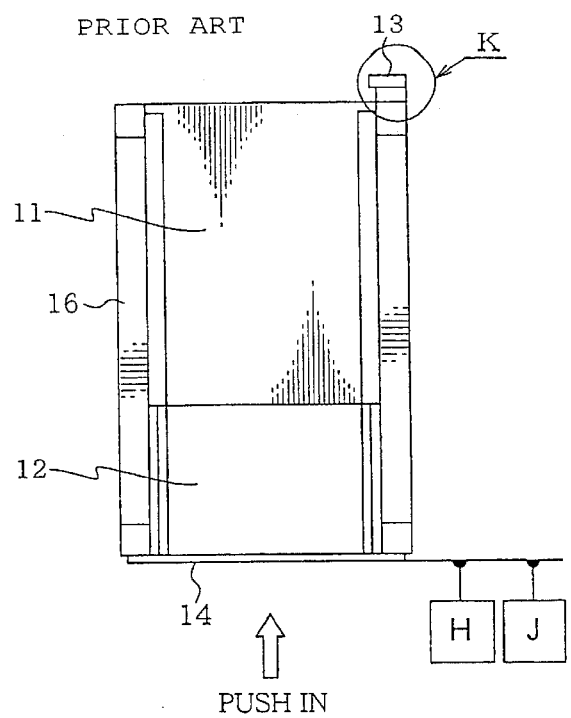
*FIG.8(a)* PRIOR ART
*FIG.8(b)* PRIOR ART
PULL OUT
PUSH IN
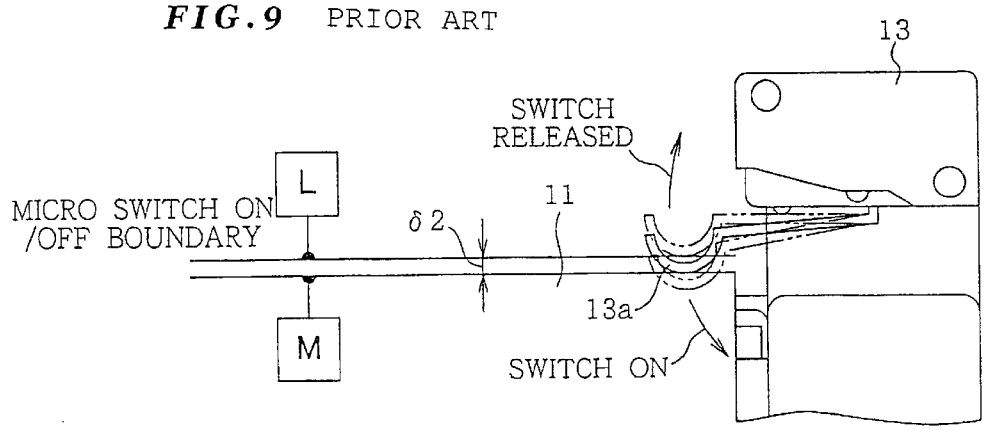
*FIG.9* PRIOR ART

MAGNETIC TAPE DRIVE MOUNTING DETECTION APPARATUS

BACKGROUND OF THE INVENTION

1. Field of the Invention

The present invention relates to a magnetic tape drive mounting detection apparatus in a composite type magnetic tape apparatus for detecting that a magnetic tape drive is fixed to a predetermined position of the magnetic tape apparatus.

2. Description of the related Art

Hereinafter, explanation will be given on a conventional magnetic tape drive mounting detection apparatus in a composite type magnetic tape apparatus with reference to FIG. 7, FIG. 8, and FIG. 9.

In the configuration of the composite magnetic tape apparatus shown in FIG. 7 to FIG. 9, a plurality of slidable deck trays 12 are mounted (in the figures, only one deck tray is shown), and a magnetic tape drive 11 is fixed onto the deck tray 12. Moreover, a fixed bar 14 which is not elastically deformed is attached to the deck tray 12. The fixed bar 14 is a member having screws 15 to fix the deck tray 12 at a predetermined position.

On the other hand, as shown in FIG. 8 (viewed from G in FIG. 7), a frame 16 has a micro switch 13 for detecting a magnetic tape drive. This micro switch operates as shown in FIG. 8 and FIG. 9. When the deck tray 12 is pushed in and a surface J of the fixed bar 14 is brought into contact with the surface H of the frame 16, the magnetic tape drive 11 pushes a sensor lever 13 and detection ON state is set in. On the contrary, when the surface J of the fixed bar 14 departs from the surface H of the frame 16, the pushing of the sensor lever 13a by the magnetic tape drive 11 is released, and detection OFF state is set in.

The aforementioned conventional technique has various problems as follows.

As the first problem, in the non-elastic fixed bar 14, the surface H and the surface J are brought into contact with each other without tightening by the screws 15 (substantial tightening starts after H and J are brought into contact). Accordingly, before the magnetic tape drive 11 is fixed completely, the detection may turn ON.

As the second problem, as shown in FIG. 9, depending on the dimensional allowances of the magnetic tape drive 11 and the deck tray 12, the surface M of the magnetic tape drive 11 may not reach a surface L of the micro switch ON/OFF boundary (leaving a clearance of δ2). This may cause an erroneous detection.

Moreover, on the contrary, if the surface M of the magnetic tape drive 11 exceeds the boundary line L, the micro switch 13 may be broken.

As the third problem, if the dimensional accuracy of the magnetic tape drive 11 and the deck tray 12 is controlled in order to eliminate the second problem, the production cost significantly increases.

As the fourth problem, if the dimensional allowance of the third problem is mitigated and adjustment is to be made by the micro switch, the adjustment should be made for each of the magnetic tape drives 11 having different dimensional allowances.

SUMMARY OF THE INVENTION

It is therefore an object of the present invention to provide a magnetic tape drive mounting detection apparatus capable of absorbing dimensional irregularities between parts and assuring to detect that a magnetic tape drive is mounted on a predetermined position in a (composite type) magnetic tape apparatus.

In order to attain the above mentioned object, the following unit are adopted in the present invention.

The magnetic tape drive mounting detection apparatus according to the present invention is for detecting that a magnetic tape drive fixed onto a deck tray sliding in a frame is mounted on a predetermined position of a magnetic tape apparatus in a composite-type magnetic tape apparatus, the detection apparatus comprising: a plate-shape elastic member attached to the deck tray for fixing the magnetic tape drive at a predetermined position; and mounting detection unit attached as a unitary block with the plate-shape elastic member, wherein the mounting detection unit performs a detection operation at a position where the plate-shape elastic member is fixed to the frame.

According to another aspect of the present invention, the magnetic tape drive mounting detection apparatus comprises: a plate-shape elastic member attached to the deck tray for fixing the magnetic tape drive at a predetermined position; and mounting detection unit attached to the frame, wherein the mounting detection unit performs a detection operation at a position where the plate-shape elastic member is fixed to the frame.

In the aforementioned magnetic tape drive mounting detection apparatus, the plate-shape elastic member is employed as a fixing member. Accordingly, when the fixing member is brought into a mere contact with the frame, the fixing member is deformed and the mounting detection unit does not operate. Moreover, the fixing member is elastically deformed until it is firmly fixed the frame. Accordingly, it is possible to set a clearance between the fixing member and the frame and to absorb dimensional irregularities.

BRIEF DESCRIPTION OF THE DRAWINGS

FIG. 1 is a plan view of an essential portion of a magnetic tape drive mounting detection apparatus according to a first embodiment of the present invention, illustrating in detail the area D of FIG. 4(b).

FIG. 2 is a front view of a magnetic tape apparatus on which the magnetic tape drive mounting detection apparatus of FIG. 1 is installed.

FIG. 3 is a right side view (viewed form A) of FIG. 2. FIG. 3(a) shows a state before mounting a magnetic tape drive (drawn outside); and FIG. 3(b) shows a state after the magnetic tape drive is mounted.

FIG. 4 is a plan view of FIG. 2 (viewed from B)

FIG. 5 is an enlarged view of a portion C in FIG. 3B.

FIG. 6 is a side view of an essential portion of the magnetic tape drive mounting detection apparatus according to a second embodiment of the present invention in a composite-type magnetic tape apparatus.

FIG. 8 is a plan view of the conventional apparatus (viewed from G in FIG. 7). FIG. 8(a) shows a state that the deck tray has been drawn out, and FIG. 8(b) shows a state that the deck tray has been pushed in.

FIG. 9 is an enlarged view of a portion K in FIG. 8(b).

DESCRIPTION OF THE PREFERRED EMBODIMENTS

Hereinafter, explanation will be given on a magnetic tape drive mounting detection apparatus in a composite type magnetic tape apparatus according to a first embodiment of the present invention.

Figure 4A:
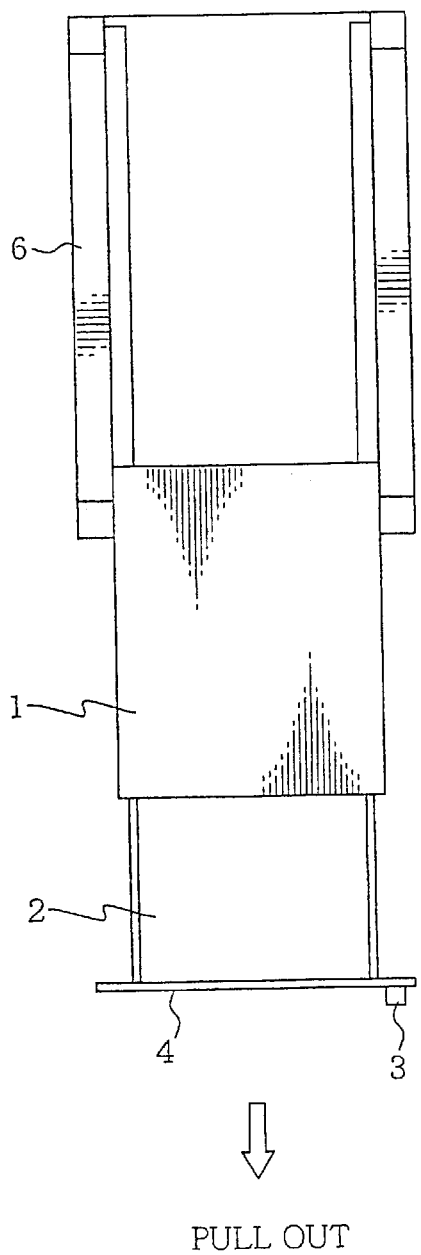
FIG. 4(a) shows a state before mounting a magnetic tape drive and FIG. 4(b) shows a state after the magnetic tape is mounted.
Figure 4B:
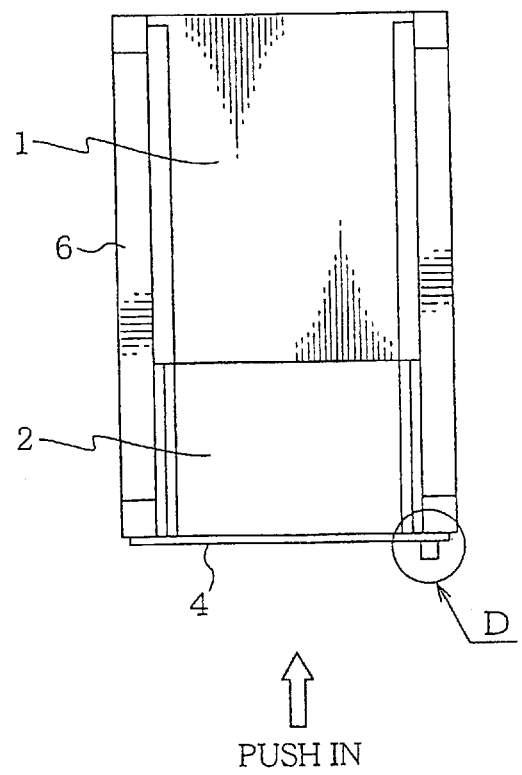

FIG. 2 is a front view, FIG. 3 is a right side view (viewed from A in FIG. 2), and FIG. 4 is a plan view (viewed from B in FIG. 2), in which reference symbol 1 denotes a magnetic tape drive, 2 denotes a deck tray, 3 denotes a micro switch as mounting detection unit, 4 denotes a fixed plate spring as a plate-shaped elastic member, 5 denotes a screw, and 6 denotes a frame.

In the composite-type magnetic tape apparatus, a mounting detection apparatus is provided for detecting that the magnetic tape drive 1 is set at a predetermined position. This mounting detection apparatus detects that the magnetic tape drive mounted at a predetermined position through detection by the micro switch 3.

As shown in FIG. 2, FIG. 3, and FIG. 4, the composite-type magnetic tape apparatus includes several slidable deck trays 2, on which the magnetic tape drive 1 is fixed. Here, the magnetic tape drive 1 is an apparatus for reading out/writing a magnetically recorded tape.

In the first embodiment, the deck tray is provided with a fixed plate spring 4 which elastically deforms. Furthermore, a micro switch 3 is attached to this fixed plate spring 4. Here, the fixed plate spring 4 is a plate-shaped elastic member for fixing the deck tray 2 at a predetermined position with the screw S. The micro switch 3 is a sensor for detecting whether the magnetic tape drive 1 is at a predetermined position.

Figure 1A:
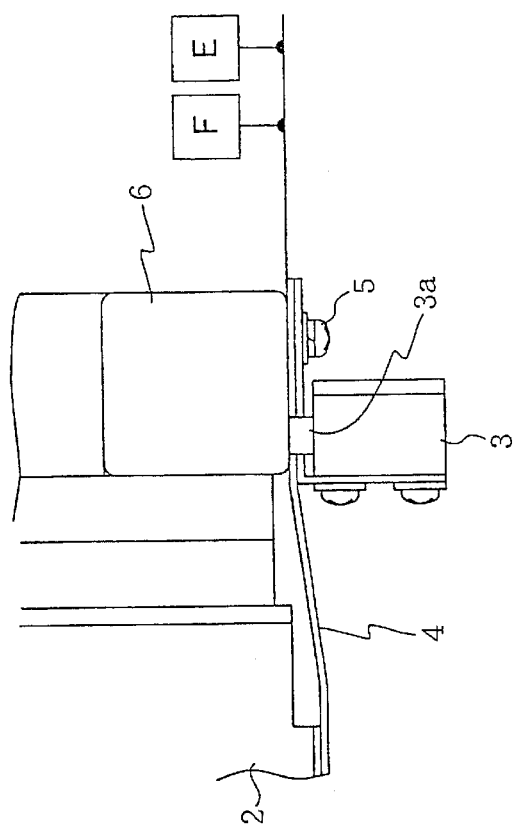
FIG. 1(a) shows a state before mounting a magnetic tape drive.
Figure 1B:
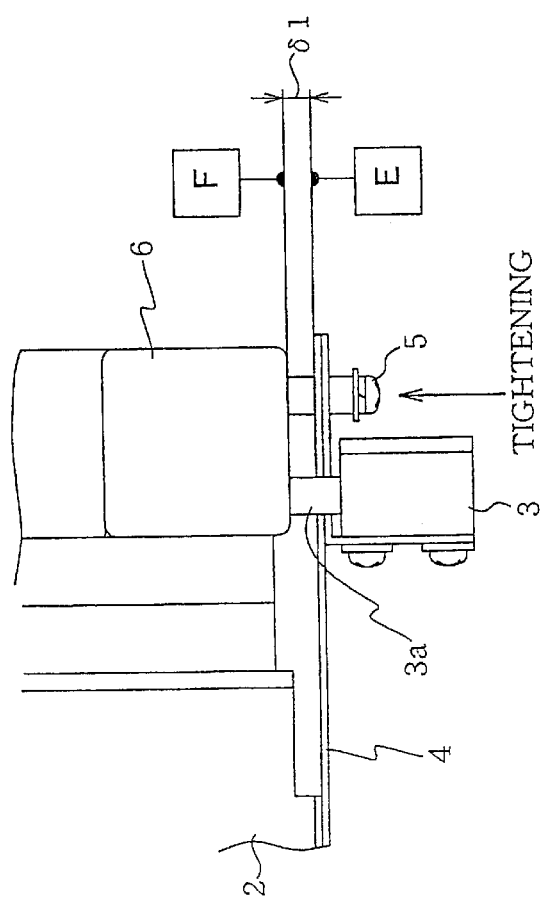
FIG. 1(b) shows a state after the magnetic tape drive is mounted.
Figure 5A:
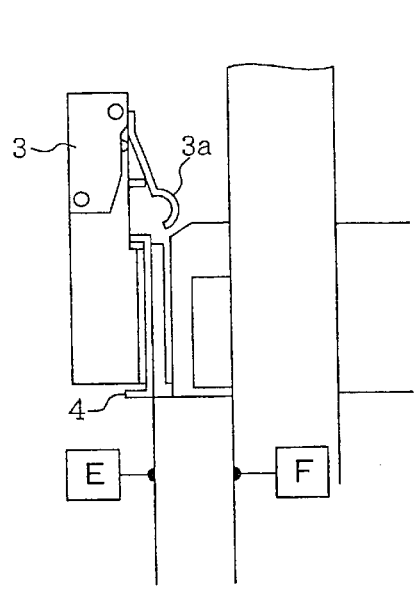
FIG. 5(a) shows a state before mounting a magnetic tape drive.
Figure 5B:
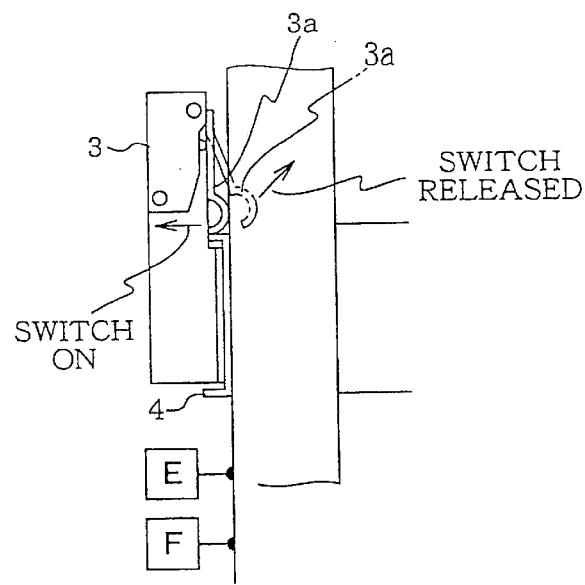
FIG. 5(b) shows a state after the magnetic tape drive is mounted.

As shown in FIG. 1 and FIG. 5, the fixed plate spring 4 and the micro switch 3 have been adjusted to detect when the sensor lever 3a reaches the surface E (opposing to the frame 6) of the fixed plate spring 4.

Next, explanation will be given on the operation of the micro switch 3. As shown in FIG. 1 and FIG. 5, the magnetic tape drive 1 is pushed to the end position and the fixed plate spring 4 is tightened by the screw 5. Here, the fixed plate spring 4 is elastically deformed so that the surface E of the fixed plate spring 4 is in contact with the surface F of the frame 6 and accordingly, the clearance dimension $\delta 1=0$. Simultaneously with this, the sensor lever 3a is also brought into contact with the surface F of the frame 6, and the micro switch detection turns ON.

On the contrary, when the screw 5 is loosened, a clearance $\delta 1$ is present between the fixed plate spring 4 and the frame 6 and accordingly, the sensor lever 3a is released and the detection turns OFF.

That is, as shown in FIG. 1 and FIG. 5, since the fixed plate spring 4 attached to the deck tray 2 and the micro switch 3 is formed as a unitary block, when the screw 5 is tightened, the fixed plate spring 4 is elastically deformed, and the sensor lever 3a of the micro switch 3 is pushed by the frame 6 for detection. Here, even if the clearance dimension $\delta 1$ is set irregularly, elastic deformation is caused for the $\delta 1$ by the tightening of the screw 5. Accordingly, there is no need of accurate dimensions of the parts. Moreover, because the position of the sensor lever 3a is adjusted in a sub-assembly unit of the fixed plate spring 4 and the micro switch 3, it is possible to accept any magnetic tape drive 1, and there is no need of adjustment for each of the magnetic tape drive.

Moreover, when $\delta 1 = 0$, the sensor lever 3a is brought into contact with the frame 6 before tightening by the screw 5. However, detection at this point can be prevented by setting the fixed plate spring 4 to be easily deformed with a force smaller than the force required by the detection with the sensor lever 3a. Thus, tightening with the screw 5 causes detection of the mounting state.

Figure 6A:
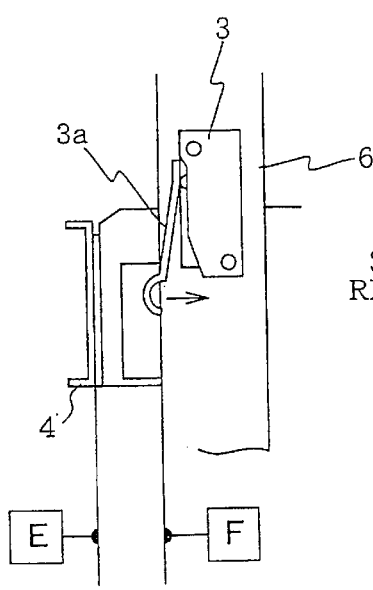
FIG. 6(a) shows a state before mounting a magnetic tape drive.
Figure 6B:
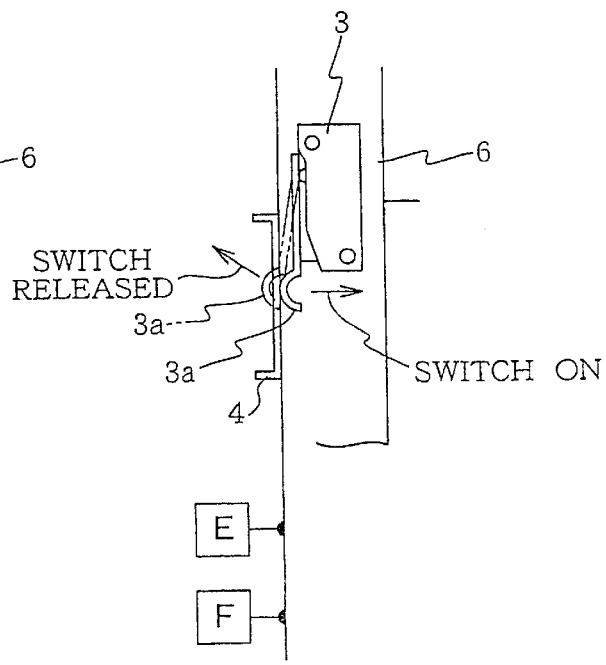
FIG. 6(b) shows a state after the magnetic tape drive is mounted.
Figure 7:
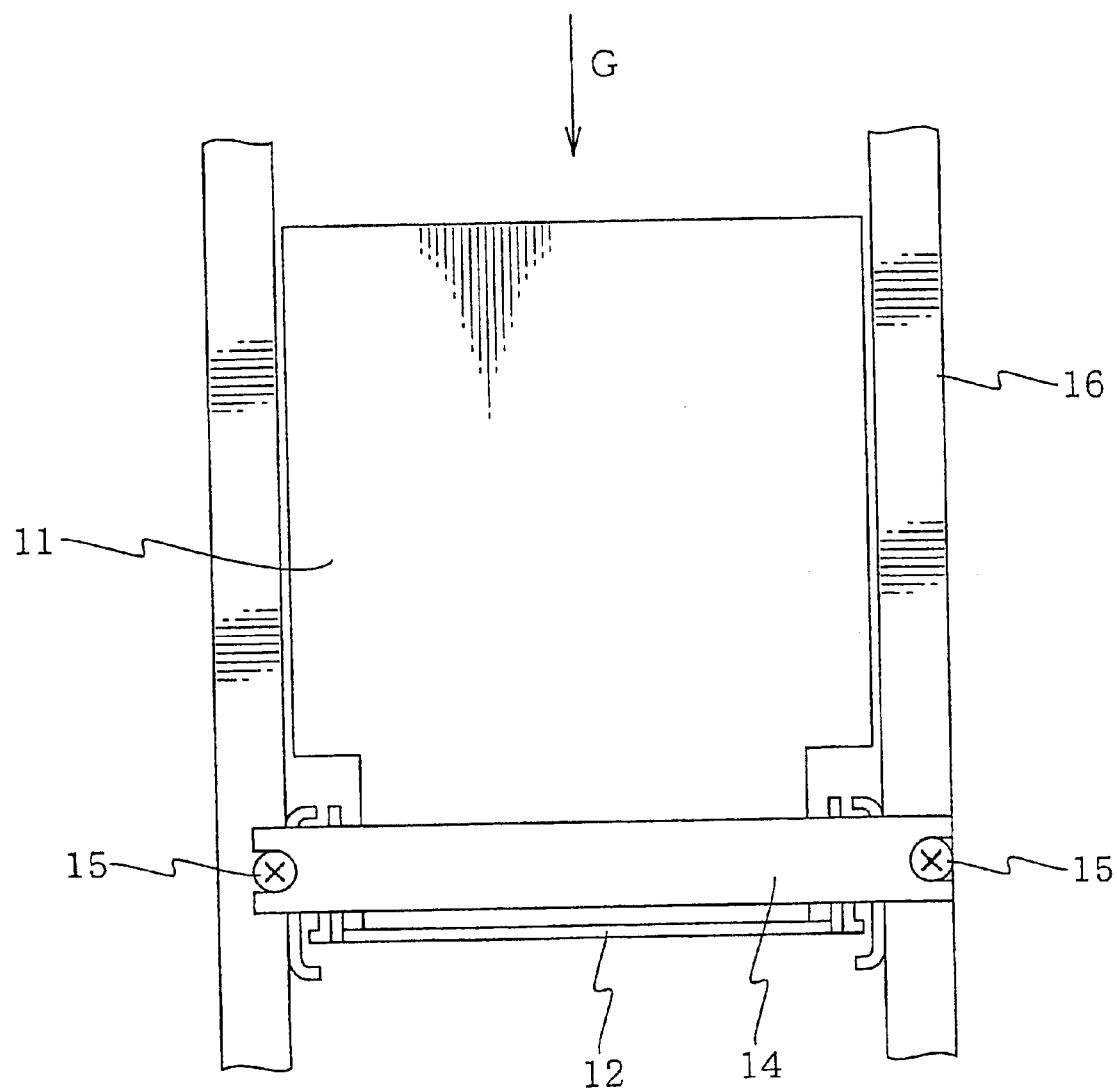
FIG. 7 is a front view of a conventional apparatus.

In the aforementioned first embodiment, the micro switch 3 is mounted to the side of the slidable deck tray 2. In the second embodiment, as shown in FIG. 6, the micro switch 3 is attached to the frame 6. With this configuration, it is possible to perform detection in the same way as in the first embodiment.

That is, the fixed plate spring 4 which has been elastically deformed is fixed to the frame 6, so that the sensor lever 3a of the micro switch 3 is pushed for detection. Accordingly, it is possible to absorb irregularities of the clearance $\delta 1$.

The magnetic tape drive mounting detection apparatus according to the present invention has effects as follows.

Firstly, the micro switch is operated by adjustment of a sub-assembly of the fixed plate spring and the micro switch. Accordingly, there is no need of adjustment for each of the magnetic tape drives.

Secondly, when performing detection without adjustment of the respective magnetic tape drives, it is necessary to have a mechanical accuracy of parts (which costs much). However, a unitary block with a plate spring which elastically deforms absorbs irregularities of the aforementioned clearance $\delta 1$. Accordingly, there is no need of mechanical accuracy (which costs less).

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magnetic tape drive mounting detection apparatus for detecting that magnetic tape drive fixed onto a deck tray sliding in a frame is mounted on a predetermined position of a magnetic tape apparatus in a composite-type magnetic tape apparatus, said detection apparatus comprising:

a plate-shaped elastic member attached to the deck tray for fixing the magnetic tape drive at a predetermined position; and mounting detection unit attached as a unitary block with the plate-shaped elastic member, wherein the mounting detection unit performs a detection operation at a position where the plate-shaped elastic member is fixed to the frame.

2. A magnetic tape drive mounting detection apparatus for detecting that a magnetic tape drive fixed onto a deck tray sliding in a frame is mounted on a predetermined position of a magnetic tape apparatus in a composite-type magnetic tape apparatus, said detection apparatus comprising:

a plate-shaped elastic member attached to the deck tray for fixing the magnetic tape drive at a predetermined position; and mounting detection unit attached to the frame, wherein the mounting detection unit performs a detection operation at a position where the plate-shaped elastic member is fixed to the frame.

3. A magnetic tape drive mounting detection apparatus as claimed in claim 1, wherein the mounting detection unit includes a micro switch.

4. A magnetic tape drive mounting detection apparatus as claimed in claim 2, wherein the mounting detection unit includes a micro switch.

5. A magnetic tape drive mounting detection apparatus as claimed in claim 3, wherein the micro switch includes a sensor lever having a predetermined length.

6. A magnetic tape drive mounting detection apparatus as claimed in claim 4, wherein the micro switch includes a sensor lever having a predetermined length.

7. A magnetic tape drive mounting detection apparatus as claimed in claim 5, wherein the plate-shaped elastic member is deformed by a strength smaller than a strength required for detection operation of the sensor lever.

8. A magnetic tape drive mounting detection apparatus as claimed in claim 6, wherein the plate-shaped elastic member is deformed by a strength smaller than a strength required for detection operation of the sensor lever.

9. A magnetic tape drive mounting detection apparatus as claimed in claim 7, wherein the magnetic tape drive is fixed using a predetermined screw.

10. A magnetic tape drive mounting detection apparatus as claimed in claim 8, wherein the magnetic tape drive is fixed using a predetermined screw.

\* \* \* \* \*